Nov. 27, 1951  J. E. GOLOB  2,576,877
THERMOSTATIC VALVE CONTROLLING DEVICE
Filed Jan. 26, 1949  2 SHEETS—SHEET 1
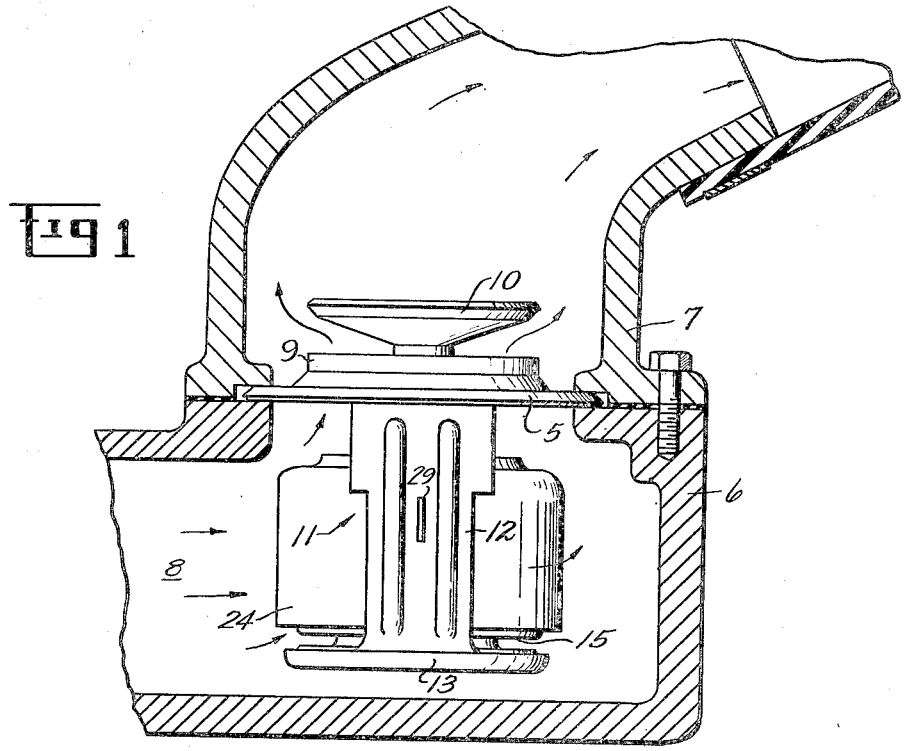
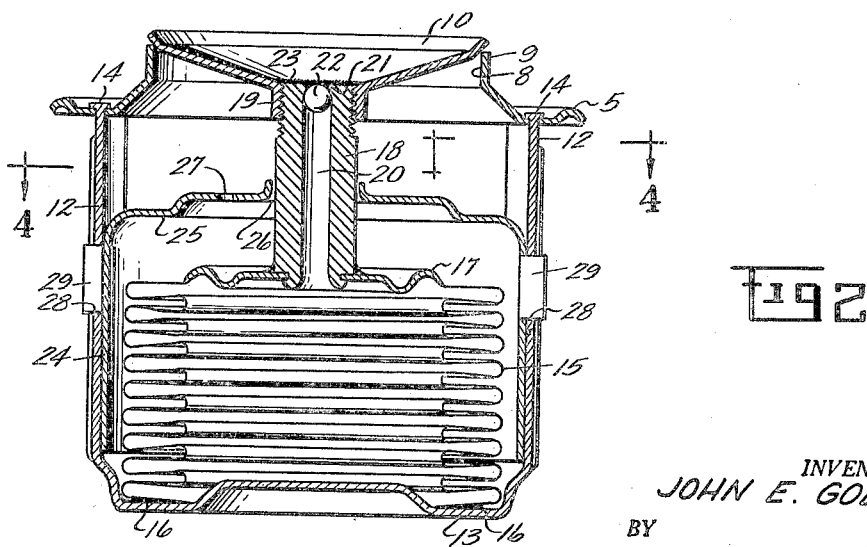
INVENTOR.
JOHN E. GOLOB
BY
ATTORNEY Nov. 27, 1951 J. E. GOLOB 2,576,877
THERMOSTATIC VALVE CONTROLLING DEVICE
Filed Jan. 26, 1949 2 SHEETS—SHEET 2

INVENTOR.
JOHN E. GOLOB
BY
ATTORNEY—

Patented Nov. 27, 1951

2,576,877

UNITED STATES PATENT OFFICE 2,576,877

THERMOSTATIC VALVE CONTROLLING DEVICE

John E. Golob, Dayton, Ohio, assignor to Standard-Thomson Corporation, Dayton, Ohio, a corporation of Delaware Application January 26, 1949, Serial No. 72,920

7 Claims. (Cl. 236—34)

This invention relates to a thermostatic valve controlling device, and is designed primarily for use in the cooling system of an automobile engine.

Thermostatic devices of this general type are well known and one object of the invention is to provide such a device with means for protecting the bellows type thermostat from injury due to vibrations caused by the impact of the liquid thereon, or by abrasive sediment in the liquid.

A further object of the invention is to provide a device which will function as a dash pot to control the movements of the bellows, and as a stop to positively limit the expansion thereof.

A further object of the invention is to provide a device which will maintain the bellows at substantially the temperature of the ambient liquid when the valve is closed.

A further object of the invention is to provide a simple element having means for accomplishing all the foregoing objects.

Other objects of the invention may appear as the device is described in detail.

Figure 3:
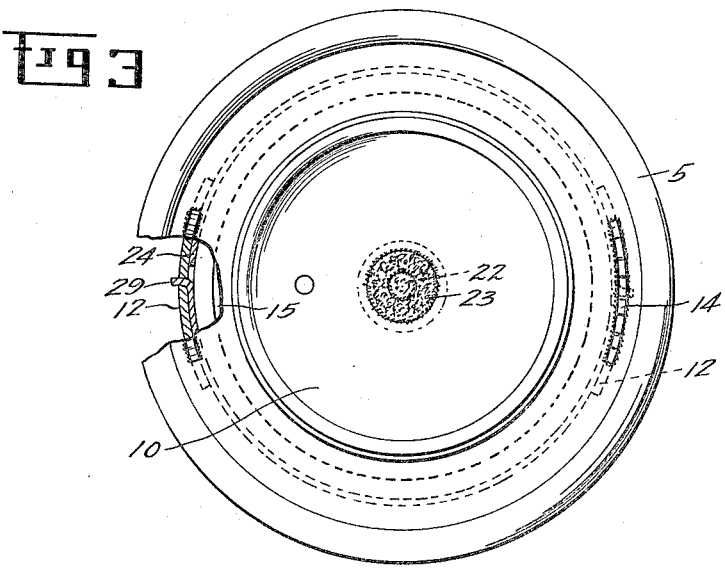
Figure 4:
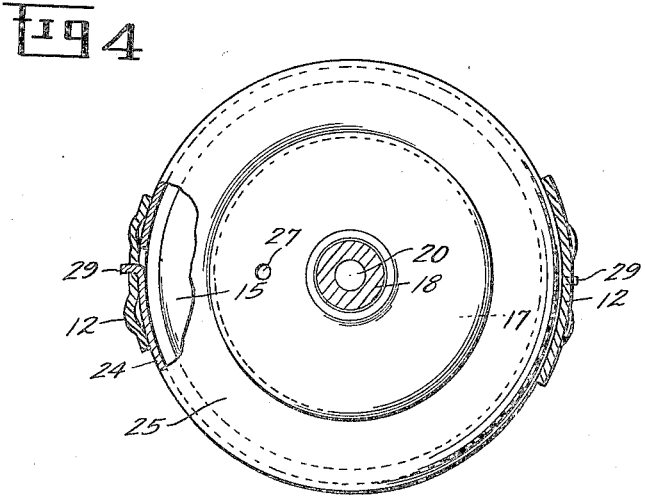

In the accompanying drawings Fig. 1 is a side elevation of a device embodying the invention, showing a portion of an engine in section; Fig. 2 is a vertical section taken centrally through the device; Fig. 3 is a top plan view of the device, partly broken away; and Fig. 4 is a section taken on the line 4—4 of Fig. 2.

In these drawings I have illustrated one embodiment of the invention and have shown the same as embodied in a thermostatic flow controlling device of a known type which is adapted to be supported in the cooling system of an internal combustion engine. It is to be understood, however, that the invention may take various forms and may be applied to thermostatic devices of various kinds and used for various purposes, without departing from the spirit of the invention.

In the particular embodiment here illustrated the device comprises a member 5 adapted to be mounted between the water jacket 6 of an internal combustion engine and a rigid part 7 of a conduit leading from the water jacket to the radiator, not shown. The member is provided with a relatively large aperture or passageway 8 through which the cooling liquid may flow and is, preferably, substantially annular in form. A valve seat 9 extends about the passage and a valve 10 cooperates with the valve seat to control the flow of the liquid. Secured to the annular member 5 and extending downwardly therefrom is a structure 11 adapted to support a thermostatic bellows in the path of flow of the liquid from the water jacket to the radiator, the supporting structure having an opening facing the oncoming liquid. Preferably the supporting structure comprises arms 12 spaced laterally one from the other and connected at their lower ends by a cross member, here shown as a circular plate 13. The arms may be secured to the annular member 5 in any suitable manner but in the present instance the arms are of substantial width and are provided at their upper ends with lugs 14 which extend through openings in the member 5 and are upset, or bent, onto the upper surface of the member 5 to secure the arms thereto, the lugs being preferably soldered to the member 5. The arms are preferably curved about longitudinal axes. The bellows 15 is of a conventional type and the lower end thereof is supported on and has sealed connection with the plate 13, as shown at 16. The top wall 17 of the bellows has secured thereto the lower end of an elongate member 18, the upper end of which is secured to the valve 10 and which thus constitutes a valve stem. The valve member is preferably so connected with the valve stem that it may be adjusted with relation to the bellows and as here shown the upper end of the valve stem is screw threaded into a boss 19 on the valve member. The valve stem is also provided with an axial bore 20 the upper end of which is of reduced diameter to form a valve seat 21 and limit the upward movement of the ball valve 22. When the valve member 10 has been properly adjusted it is rigidly secured to the valve stem and the ball valve is secured to its seat, as by soldering as shown at 23. When the cooling liquid has a relatively low temperature the bellows will remain in its contracted condition, as shown in Fig. 2, and as the temperature of the liquid increases the bellows will expand and move the valve member 10 to an open position determined by the temperature of the liquid.

As has been stated, thermostatic devices of this general type are well known and the present invention resides mainly in providing such a device with means for protecting the bellows from injury and for controlling the movements thereof. For this purpose there is provided a guard which is supported by the structure 11 and extends about that side of the bellows which faces the oncoming liquid and prevents the direct impact of the liquid against the bellows, thus preventing or minimizing the vibration of the bellows which results from such impact and is destructive of the bellows. The guard also prevents abrasive sediment which may be carried in the liquid from contacting the bellows. Preferably the guard is cylindrical in form, as shown at 24, and extends entirely about the bellows with its open lower end spaced a short distance above the plate 13. The upper end of the cylindrical guard is substantially closed by a top wall 25 which is integral with the cylindrical portion thereof and is provided with a guide opening 26 through which the valve stem 18 extends, the top wall thus holding the valve stem against lateral displacement. The top wall is spaced from the upper or movable end of the bellows a distance sufficient to permit the normal expansion of the bellows but is so located that it constitutes a positive stop to limit the expansion of the bellows and thus prevent injury thereto by over expansion. The guard being of inverted cup shape functions as a dash pot to regulate the movements of the bellows and is preferably vented for that purpose. The top wall is provided with a relatively small opening 27 through which liquid may flow to and from the interior of the guard and thus maintain the bellows at a temperature corresponding substantially to the temperature of the ambient liquid when there is little or no flow of liquid about the valve.

The cylindrical guard may be supported on the structure 11 in any suitable manner. Preferably each arm 12 is provided with a slot 28 and the cylindrical portion of the guard is provided with lugs 29 which are preferably struck from the body of the guard and extend through the respective slots 28 so as to rigidly support the guard on the structure.

Thus it will be apparent that the guard so encloses the bellows as to protect the same against injury by rapidly flowing liquid or by sediment contained in that liquid and also controls the movement of bellows and positively limits the expansion thereof. The guard and its supporting structure are of such a character and so located with relation to the passage through the member 5 that the major portion of the liquid flows about the guard to the passage while a portion flows about the lower edge of the guard into contact with the bellows and maintains the latter at the temperature of the liquid flowing through the passage. The guard being open at its lower end permits the free drainage of liquid therefrom and the removal of any sediment which may be contained in the liquid.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a thermostatic device of the type comprising an apertured member to be mounted in a liquid cooling system, a valve to control the flow of liquid through said member, arms extending downwardly from said member, a plate carried by said arms, an expansible bellows having one end thereof attached to said plate, and a stem connecting said bellows with said valve; a cylindrical guard supported by and between said arms, extending about said bellows and having an open lower end adjacent to and spaced from said plate, and also having an end wall spaced from the movable end of said bellows and having an opening through which said stem extends, said arms having openings therethrough, and lugs struck from said guard and extending through said openings in the respective arms.

2. A guard for the thermostat of a valve controlling mechanism of the type comprising a supporting structure to be mounted in the flow path of the liquid in a cooling system and having a relatively large opening facing the oncoming liquid, a thermostatic bellows supported on said structure in line with said opening and with its lower end in a fixed position, and means for connecting the upper end of said bellows with said valve; said guard comprising an element supported by said supporting structure and having an imperforate part interposed between said bellows and said opening in said structure, said part extending for the full width of said opening with its upper end adjacent the upper limit of expansion of said bellows and with its lower end adjacent the fixed lower end of said bellows.

3. A guard for the thermostat of a valve controlling mechanism of the type comprising a supporting structure to be mounted in the flow path of the liquid in a cooling system and having a relatively large opening facing the oncoming liquid, a thermostatic bellows supported on said structure in line with said opening and with its lower end in a fixed position, and means for connecting the upper end of said bellows with said valve; said guard comprising an imperforate cylindrical element supported on said supporting structure between the latter and said bellows with its upper end adjacent the upper limit of expansion of said bellows and with its lower end adjacent to and spaced from the fixed lower end of said bellows.

4. A guard for the thermostat of a valve controlling mechanism of the type comprising a supporting structure to be mounted in the flow path of the liquid in a cooling system and having a relatively large opening facing the oncoming liquid, a thermostatic bellows supported on said structure in line with said opening and with its lower end in a fixed position, and means for connecting the upper end of said bellows with said valve; said guard comprising an inverted cup-shaped member supported on said supporting structure with the circumferential portion thereof between said structure and said bellows and with the end wall thereof above and spaced from the upper end of said bellows and the lower edge thereof adjacent to and spaced from the lower end of said bellows.

5. A guard for the thermostat of a valve controlling mechanism of the type comprising a supporting structure to be mounted in the flow path of the liquid in a cooling system and having a relatively large opening facing the oncoming liquid, a thermostatic bellows supported on said structure in line with said opening and with its lower end in a fixed position, and a valve stem connected with the upper end of said bellows; said guard comprising an inverted cup-shaped member supported on said supporting structure with the circumferential portion thereof between said structure and said bellows and with the upper end wall thereof above and spaced from the upper portion of said bellows and the lower edge thereof adjacent to and spaced from the lower end of said bellows, said upper wall of said guard having an opening through which said valve stem extends and a restricted orifice for the passage of liquid.

6. In a thermostatic device of the type comprising an apertured member to be mounted in a liquid cooling system, a valve to control the flow of liquid through said member, arms extending downwardly from said member, a plate carried by said arms, a thermostatic bellows having the lower end thereof attached to said plate and supported in the flow path of the liquid toward said valve, and a stem connecting said bellows with said valve; a cylindrical guard supported by and between said arms, extending about and spaced from said bellows and having an open lower end adjacent to and spaced from said plate, and also having an upper end wall spaced from the movable end of said bellows and having a guide opening for said valve stem.

7. In a thermostatic device of the type comprising an apertured member to be mounted in a liquid cooling system, a valve to control the flow of liquid through said member, arms extending downwardly from said member, a plate carried by said arms, a thermostatic bellows having the lower end thereof attached to said plate and supported in the flow path of the liquid toward said valve, and a stem connecting said bellows with said valve, a cylindrical guard supported by and between said arms, extending about said bellows, having an imperforate portion thereof between said bellows and the oncoming liquid and also having an open end adjacent said plate and spaced a short distance therefrom to permit a portion of the liquid to enter said guard and flow upwardly about said bellows, said guard having an end wall spaced from the upper end of said bellows and having an opening through which said valve stem extends, said end wall also having a restricted opening through which liquid may flow to maintain said bellows at the temperature of ambient liquid.

JOHN E. GOLOB.

REFERENCES CITED

The following references are of record in the file of this patent:

UNITED STATES PATENTS

| Number | Name | Date |
|---|---|---|
| 1,590,922 | Zimmerman | June 29, 1926 |
| 1,639,286 | Carson | Aug. 16, 1927 |
| 1,667,207 | Kinnard | Apr. 24, 1928 |
| 1,734,963 | Clifford | Nov. 12, 1929 |
| 1,783,730 | Leach | Dec. 2, 1930 |
| 2,237,766 | Pratt | Apr. 8, 1941 |
| 2,513,875 | Johnson | July 4, 1950 |

FOREIGN PATENTS

| Number | Country | Date |
|---|---|---|
| 434,705 | Great Britain | Sept. 6, 1935 |
| 473,063 | Great Britain | Oct. 5, 1937 |